United States Patent
Cooper et al.

(10) Patent No.: US 6,535,201 B1
(45) Date of Patent: Mar. 18, 2003

(54) METHOD AND SYSTEM FOR THREE-DIMENSIONAL TOPOGRAPHICAL MODELING

(75) Inventors: Michael Cooper, Austin, TX (US); Michael Paolini, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/466,436

(22) Filed: Dec. 17, 1999

(51) Int. Cl.[7] ................................................. G09G 5/00
(52) U.S. Cl. ..................... 345/173; 434/114; 340/407.1
(58) Field of Search ................................. 345/173, 179; 178/18.01–18.07; 341/27; 340/407.1; 434/113, 114

(56) References Cited

U.S. PATENT DOCUMENTS

| | | | |
|---|---|---|---|
| 5,717,423 A | * | 2/1998 | Parker .......................... 345/108 |
| 5,736,978 A | * | 4/1998 | Hasser et al. ................ 345/156 |
| 5,977,867 A | * | 11/1999 | Blouin ...................... 178/18.01 |
| 5,988,902 A | * | 11/1999 | Holehan ....................... 341/22 |
| 6,340,957 B1 | * | 1/2002 | Adler et al. .................. 345/1.3 |

* cited by examiner

*Primary Examiner*—Bipin Shalwala
*Assistant Examiner*—Ricardo Osorio
(74) *Attorney, Agent, or Firm*—Marilyn Smith Dawkins; Bracewell & Patterson, L.L.P.

(57) ABSTRACT

A method and system for three-dimensional topographical modeling. A control surface that is adjustable provides a tactile-detectable graphical representation of a three-dimensional graphical image and associated physical characteristics. A sensitivity element detects an external force applied to the control surface. A controller adjusts the tactile-detectable graphical representation to model the associated physical characteristics of the three-dimensional graphical image when external force is applied to the control surface.

36 Claims, 7 Drawing Sheets

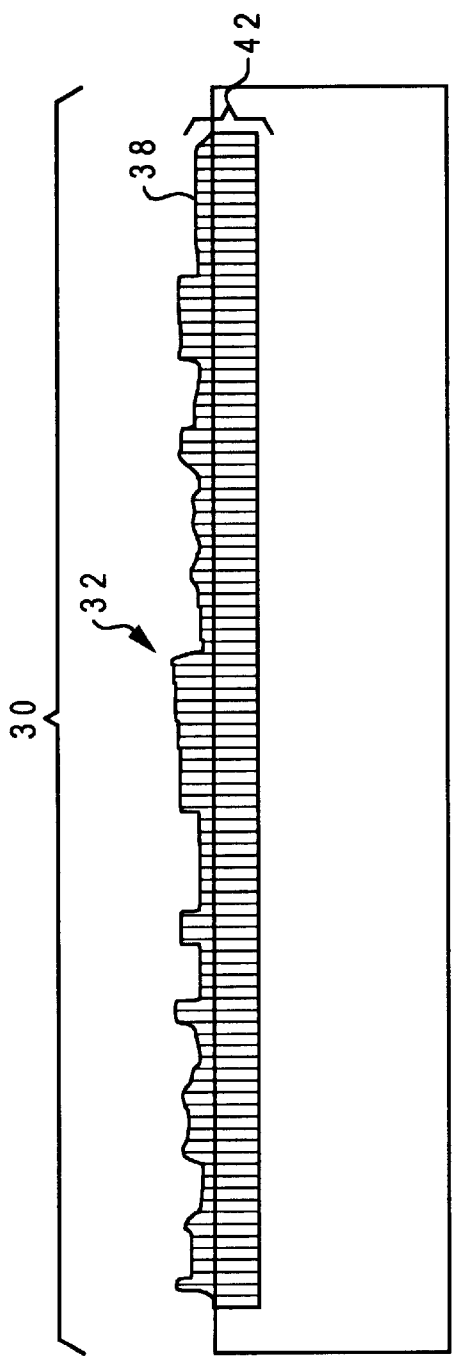
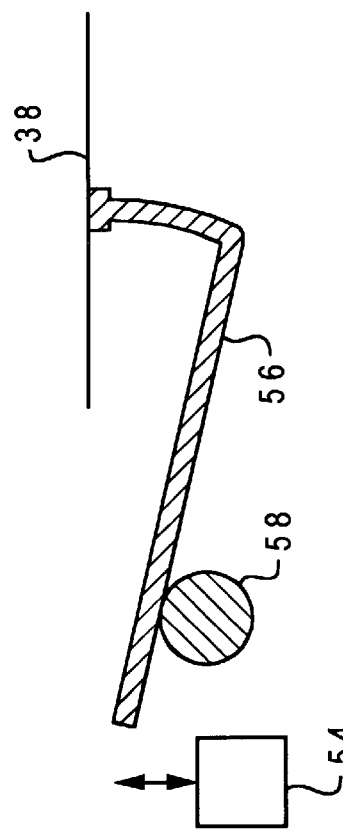
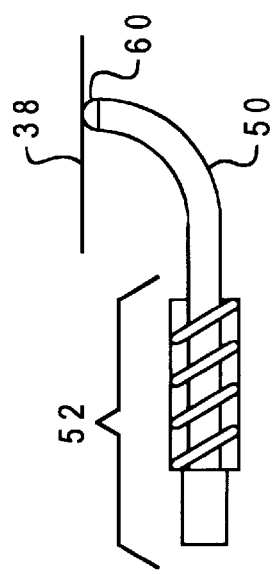

METHOD AND SYSTEM FOR THREE-DIMENSIONAL TOPOGRAPHICAL MODELING

BACKGROUND OF THE INVENTION

1. Technical Field

The present invention relates in general to interface devices, and in particular to an improved three-dimensional topographical model for a data processing system. Still more particularly, the present invention relates to a method and system for providing a tactile-detectable graphical representation and a visual graphical representation of a graphical output.

2. Description of the Related Art

Data processing systems typically rely on at least one if not multiple independent peripheral devices in order to receive inputs and/or transmit outputs to provide human-computer interactions. In general, data processing systems rely on a pointing device and a data entry device for receiving inputs and a display device for outputting data in a visual manner.

Presently, typical display devices include, for example, a display monitor, an overhead projection monitor, or other alternate device by which data may be displayed in a visual manner from a data processing system. These display devices may be utilized to convey a wide range of information, however are typically limited to two-dimensional display. While graphical achievements have been made in order to display a virtually three-dimensional object, the three-dimensional world is still limited to two-dimensional visual representation with typical display devices.

Another area of development in interface devices is in providing tactile-detectable surfaces that convey information to a user. Hyper-braille readers are an example of such an interface device, allowing seeing-impaired users to detect braille letters from a tactile-detectable surface. In U.S. Pat. No. 5,736,978, a tactile graphics display for braille reading is provided. The tactile graphics display combines a Braille character-like display and a planar absolute position sensor. While hyper-braille readers provide a needed interface for entering and reading braille letters, they are limited to the area.

A device that attempts to merge a display device with a tactile-detectable surface is proposed as a three-dimensional display in U.S. Pat. No. 5,717,423. FIG. 10 of the present application depicts a prior art illustration of a three-dimensional display that provides a device for displaying objects both visually and three-dimensionally. Multiple types of display shapes, such as a display shape 210 are controlled by actuators to provide a block-like three-dimensional representation of a display. Visual display devices are included on the display shapes to provide a visual three-dimensional representation of a display. A sensing system detects when a user touches a display shape and responds accordingly. However, the sensing system does not provide for detecting the magnitude of force from user input and responding with force feedback. In addition, three-dimensional modeling of physical characteristics of graphical objects and scanning of three-dimensional objects is not provided in the prior art.

Developed in parallel with display devices, typical data entry devices include, for example, a keyboard, a keypad, or other alternate device through which data in the form of control indicia or other symbol may be input. Data entry devices, such as the keyboard are limited in that they receive input in relation to fixed control indicia.

Developed to supplement data entry devices are scanner devices. Scanners provide an optical input device that utilizes light-sensing equipment to capture an image on paper or some other subject. The image is then translated into a digital signal that can then be manipulated by optical character recognition software or graphics software. Most scanners are limited in that only a two-dimensional image is captured. Advances in laser technology have led to scanners that can detect a three-dimensional image, however, these three-dimensional scanners do not detect physical characteristics such as temperature, texture and resiliency.

In view of the foregoing, it would be preferable to provide for three-dimensional topographical modeling of data. In providing three-dimensional topographical modeling, it would be preferable to model physical characteristics of graphical objects such as temperature, texture and resiliency. Moreover, it would be preferable to model three-dimensional objects in true form. In addition, it would be preferable to provide a technique for scanning three-dimensional objects. In addition, it would be preferable to scale both input and output. The three-dimensional topographical modeling is preferably rendered by a topographical interface device that provides three-dimensional tactile-detectable display and visual display.

SUMMARY OF THE INVENTION

In view of the foregoing, it is therefore one object of the present invention to provide an improved interface device.

It is another object of the present invention to provide a method and system for three-dimensional topographical modeling of a graphical image.

It is yet another object of the present invention to provide a method and system for modeling a graphical image with associated physical characteristics and adjusting the model when external force is applied thereto.

In accordance with a preferred embodiment of the method and system of the present invention, a control surface that is adjustable provides a tactile-detectable graphical representation of a three-dimensional graphical image and associated physical characteristics. A sensitivity element detects the magnitude and direction of external force applied to the control surface. A controller then adjusts the tactile-detectable graphical representation to model the associated physical characteristics of the three-dimensional graphical image when external force is applied to the control surface.

Objects, features, and advantages of the present invention will become apparent in the following detailed written description.

DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein:

FIG. 3 depicts a side-view of a topographical interface in accordance with a preferred embodiment of the method and system of the present invention;

FIG. 4 illustrates a schematic illustration of a driver mechanism that may be utilized as a supportive mechanism for the topographical interface in accordance with the method and system of the present invention;

FIG. 5 depicts a schematic illustration of a lever pin that may be utilized for raising and lowering the topographical interface in accordance with the method and system of the present invention;

DETAILED DESCRIPTION OF THE PREFERRED EMBODIMENT

The present invention may be executed in a variety of systems, including a variety of computers under a number of different operating systems. The computer may be, for example, a personal computer, a network computer, a midrange computer or a mainframe computer. In addition, the computer may be a stand-alone system or part of a network such as a local-area network (LAN) or a wide-area network (WAN).

Figure 1:
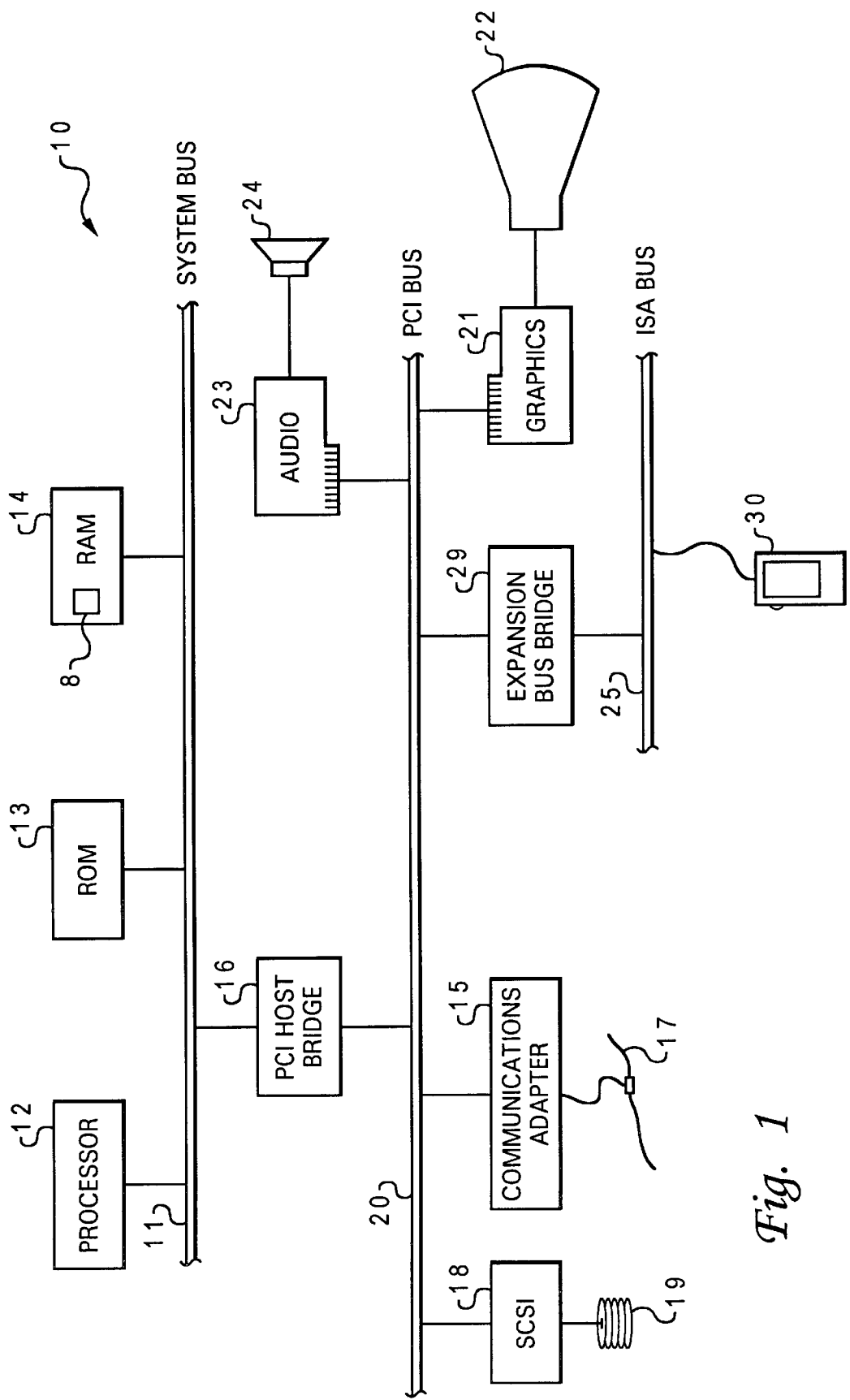
FIG. 1 depicts a block diagram of a typical computer system that may utilize a preferred embodiment of the present invention.

Referring now to the drawings and in particular to FIG. 1, there is depicted a block diagram of a typical computer system that may utilize a preferred embodiment of the present invention. As shown, a processor (CPU) 12, a read-only memory (ROM) 13, and a Random-Access Memory (RAM) 14 are connected to a system bus 11 of a computer system 10. CPU 12, ROM 13, and RAM 14 are also coupled to a PCI local bus 20 of computer system 10 through a PCI host bridge 16. PCI Host Bridge 16 provides a low latency path through which processor 12 may directly access PCI devices mapped anywhere within bus memory and/or I/O address spaces. PCI Host Bridge 16 also provides a high bandwidth path for allowing PCI devices to directly access RAM 14.

Also attaching to PCI local bus 20 are communications adapter 15, small computer system interface (SCSI) 18, and expansion bus bridge 29. Communications adapter 15 is for connecting computer system 10 to a network 17. SCSI 18 is utilized to control high-speed SCSI disk drive 19. Expansion bus bridge 29, such as a PCI-to-ISA bus bridge, may be utilized for coupling ISA bus 25 to PCI local bus 20. As shown, a topographical modeling system 30 is attached to ISA bus 25 for performing certain basic I/O functions. In addition, an audio adapter 23 is attached to PCI local bus 20 for controlling audio output through speaker 24. In alternate embodiments of the present invention, additional peripheral components may be added.

Computer system 10 also preferably includes an interface such as a graphical user interface (GUI) and an operating system (OS) that reside within machine readable media to direct the operation of computer system 10. The operating system preferably enables the device drivers that manipulate topographical modeling system 30. Any suitable machine-readable media may retain the GUI and OS, such as RAM 14, ROM 13, SCSI disk drive 19, and other disk and/or tape drive (e.g. magnetic diskette, magnetic tape, CD-ROM, optical disk, or other suitable storage media). Any suitable GUI and OS may direct CPU 12. For example, the AIX operating system is one of IBM's operating systems, which may be implemented.

Further, computer system 10 preferably includes at least one software application (e.g. program product) that resides within machine readable media, for example a topographical control application 8 within RAM 14. Topographical control application 8 may control the interaction of topographical modeling system 30 with computer system 10. A software application contains instructions that when executed on CPU 12 carry out the operations depicted in the flow chart of FIG. 8 and others described herein. Alternatively, as previously described, the operating system may control interaction of topographical modeling system 30 with computer system 10.

Figure 2B:
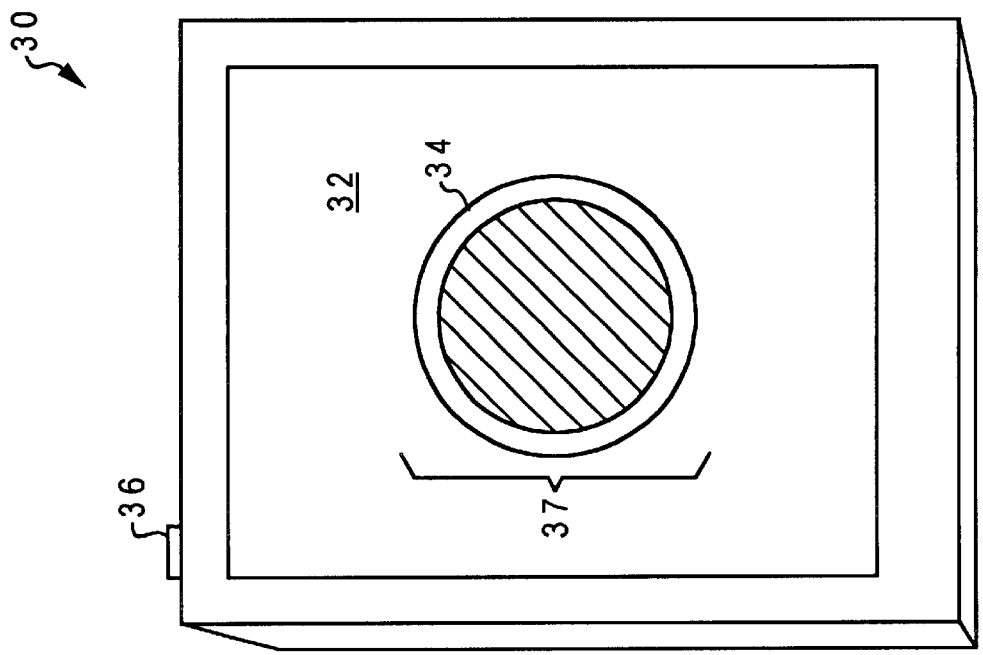
FIGS. 2a–2b illustrates a pictorial diagram of a topographical modeling system in accordance with a preferred embodiment of the method and system of the present invention.
Figure 2A:
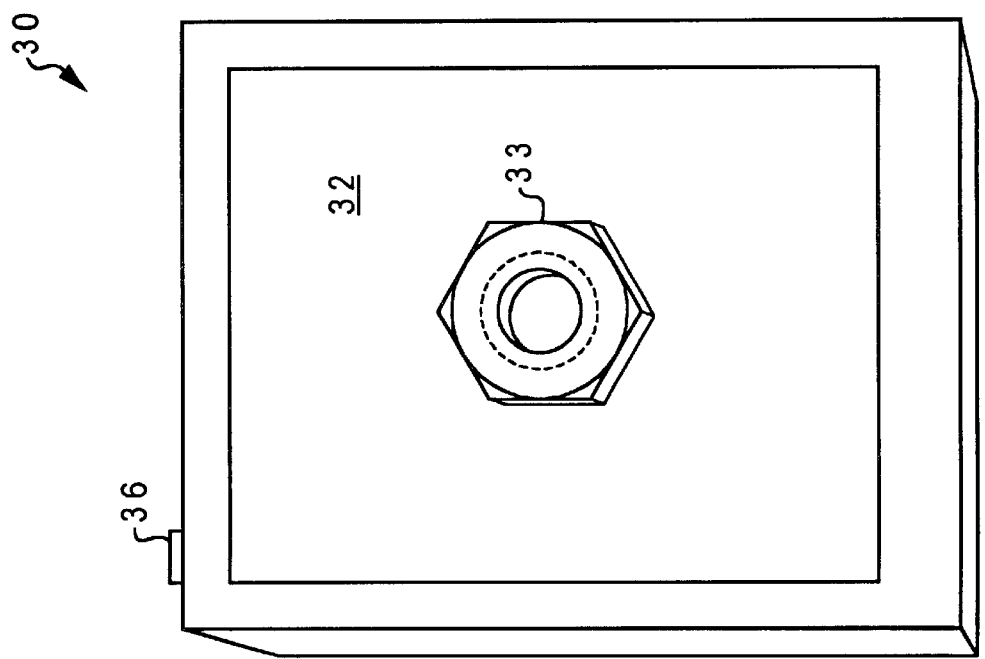

Referring now to FIGS. 2a–2b, there is illustrated a pictorial diagram of a topographical modeling system in accordance with a preferred embodiment of the method and system of the present invention. As depicted, a topographical modeling system 30 comprises a topographical interface 32. Preferably, topographical modeling system 30 is enabled to perform the functions of multiple types of interface devices. While one embodiment for housing topographical modeling system 30 is depicted, it will be understood that multiple types of housing for topographical modeling system 30 may be utilized.

Topographical modeling system 30 further comprises a connection element 36 for input/output (I/O). Connection element 36 may include a physical connector to a socket of a data processing system, or may provide for wireless I/O with a data processing system. Further, topographical modeling system 30 may include the basic units of a data processing system such that connection element 36 is an internal connection and topographical modeling system 30 may function as a fully functional data processing system, instead of functioning as a peripheral to a data processing system. Moreover, additional input/output (I/O) devices may be utilized by topographical modeling system 30 including, but not limited to, audio I/O devices, stylus I/O devices, and hyper-braille devices.

As will be further described, topographical interface 32 is preferably adjustable to provide a tactile-detectable graphical representation of a three-dimensional graphical image and associated physical characteristics. Further, a display surface is preferably embedded within the topographical interface that provides a visual graphical representation of the graphical image. Associated physical characteristics may include texture, temperature, resiliency, and color. In addition, other tactile-detectable and visual physical characteristics may be included. In addition, a sensing system is provided that detects the magnitude and direction of any force applied to topographical interface 32 and responds through closed-loop force feedback when applicable. Multiple types of sensing systems may be utilized. For example, a sensing system may be included as an additional capacitive layer of topographical interface 32. In another example, the supportive mechanisms that apply pressure to topographical interface 32 may include sensing elements.

In the example of FIG. 2a, a hex nut 33 is physically placed on topographical interface 32. As described, any object or external force asserted on topographical interface 32 will be sensed and modeled graphically by topographical modeling system 30. In the example of hex nut 33, a three-dimensional graphical image of the face of hex nut 33 is preferable determined. From the graphical image model, a determination of the size, shape and other physical characteristics of hex nut 33 can be made. An actual size three-dimensional graphical model of hex nut 33 can be determined by physically placing each side and face of hex nut 33 on topographical interface 32. The three-dimensional graphical images determined for each side and each face are then merged into a three-dimensional graphical image.

In the area of on-line sales, determining a graphical image model from objects placed on topographical interface 32 can be particularly helpful. In the example, the size and shape of hex nut 33 is determined from topographical interface 32, such that a hex nut that is available for purchase from on-line sales which matches hex nut 33 can be searched for. In an alternate example, a foot size and shape may be determined from placing the foot on topographical interface 32. In this manner, a shoe that matches the foot size and shape can be searched for on-line. While two examples of objects placed on topographical interface 32 are presented, multiple types of objects may be placed on topographical interface 32 and sensed in order to determine a graphical image model.

In the example of FIG. 2b, a three-dimensional image from the top of a bird bath 37 is depicted on topographical interface 32. The actual graphical representation of FIG. 2b is limited in that dimension, texture and color of the three-dimensional image of bird bath 37 are not depicted. Therefore, a description of the three-dimensional image is provided. As depicted, a basin 34 of bird bath 37 that is filled with water 35 is visibly distinguishable. Basin 34 is formed from a ceramic substance, such as cement. Typically, ceramic substances are cool when water is placed in them. Therefore, when a user touches the top edge of basin 34, a hard, cold surface is detected. In addition, the top edge of basin 34 may be curved, where the curved edge is tactilely detectable. When a user touches water 35, a fluid, cold surface is detected. The resilience of the surface comprising water 35 preferably has the characteristic of the fluid that is displaced when an object is placed therein.

In the area of on-line sales, providing a three-dimensional graphical model on topographical interface 32 can be particularly helpful. For example, the texture and color of a sweater for sale on-line may be rendered on topographical modeling system 30, where a user can tactilely detect a portion of the sweater. In another example, rendering actual images in a three-dimensional graphical model, such as an artist sketch of a criminal where viewing the dimension of a nose, chin or other facial feature can be helpful.

With reference now to FIG. 3, there is depicted a side-view of a topographical interface for three-dimensional modeling in accordance with a preferred embodiment of the method and system of the present invention. Topographical interface 32 is preferably composed of a flexible material 38, such as latex, however in alternate embodiments may consist of multiple sections of flexible material or other alterable surface. In addition, a display surface is preferably embedded within flexible material 38 in a single section or multiple sections. The display surface may comprise any of multiple types of graphical display devices. Moreover, although not depicted, flexible material 38 may be further embedded with a capacitive layer that senses the magnitude and direction of any force applied thereto. Alternatively, a sensing system may be incorporated with supportive mechanisms 42.

Supportive mechanisms 42 preferably include multiple elements beneath the surface of flexible material 38 that are able to adjust the tactile-detectable image produced by flexible material 38. The elements may be solid, such as a screw or a pin with adjustable positions. Alternatively, the multiple elements may include fluid such as air or a liquid that are controlled to apply pressure to flexible material 38. In addition, as will be understood by one known in the art, alternative types of elements may be utilized to achieve a tactile-detectable graphical representation with flexible material 38 or another tactile detectable surface.

Supportive mechanisms 42 are preferably supported by multiple actuators (not shown) where the actuators can act upon supportive mechanisms 42 to adjust the tactile-detectable image produced by flexible material 38. Preferably the actuators control the position, resistance, temperature and vibration of supportive mechanisms 42. Thereby, while the elements applying force to flexible material 38 form the tactile-detectable graphical representation, the actuators govern the tactile-detectable graphical representation presented by the invention.

Referring now to FIG. 4, there is illustrated a schematic illustration of a driver mechanism that may be utilized as a supportive mechanism for the topographical interface in accordance with the method and system of the present invention. As illustrated, flexible material 38 is adjusted by the position of a screw flange 50. An actuator 52 rotates screw flange 50 to control the internal force that screw flange 50 places on flexible material 38. In addition, actuator 52 controls the resistance of screw flange 50 such that if external pressure is applied, the position of screw flange 50 may be adjusted with a particular resistance. A controller provides control signals to actuator 52 that designate the desired position, resistance, temperature and vibration of screw flange 50. When utilized in the present embodiment, multiple sets of screw flange 50 and actuator 52 are provided to control the pressure placed on flexible material 38 in multiple positions of flexible material 38. In addition, alternate embodiments of screw flange 50 may be utilized. For example, screw flange 50 may have a tip that is triangle, square, or circular in shape.

In addition, a touch sensitive element 60 may be utilized with each screw flange 50 to detect magnitude and direction of any external force applied thereto. In the present example, touch sensitive element is placed at the tip of screw flange 50 such that any external pressure applied to flexible material 38 is detected by touch sensitive element 60 and may be compared with the internal pressure applied thereto. Multiple types of touch sensitive elements are available and may be utilized. In addition, multiple touch sensitive elements may be positioned in multiple locations for each screw flange 50, depending upon the configuration of the embodiment. Moreover, in lieu of touch sensitive element 60, pressure on screw flange 50 may cause rotation of screw flange 50 which may be sensed and utilized to determine the magnitude and direction of the force.

With reference now to FIG. 5, there is depicted a schematic illustration of a lever pin that may be utilized for raising and lowering the topographical interface in accordance with the method and system of the present invention.

As depicted, flexible material 38 is adjusted by the position of a lever 56 along a bearing 58. An actuator 54 raises and lowers the left end of lever 56 whereby the position of the right end of lever 56 is adjusted. When utilized in the present embodiment, multiple sets of lever 56 and actuator 54 are provided to control the pressure placed on flexible material 38. In addition alternate shapes of lever 56 may be utilized. For example, lever 56 may have a tip that is triangle, square, or circular in shape. In addition, a combination of screw flange 50, lever 56 and other supporting mechanisms that are adjustable to apply tactile-detectable pressure to flexible material 38 may be utilized. For example, a supporting mechanism may be utilized whereby actuation of fluids controls the pressure applied by the supporting mechanism to flexible material 38. In addition, as depicted with screw flange 50, a touch sensitive element may be utilized.

Figure 6:
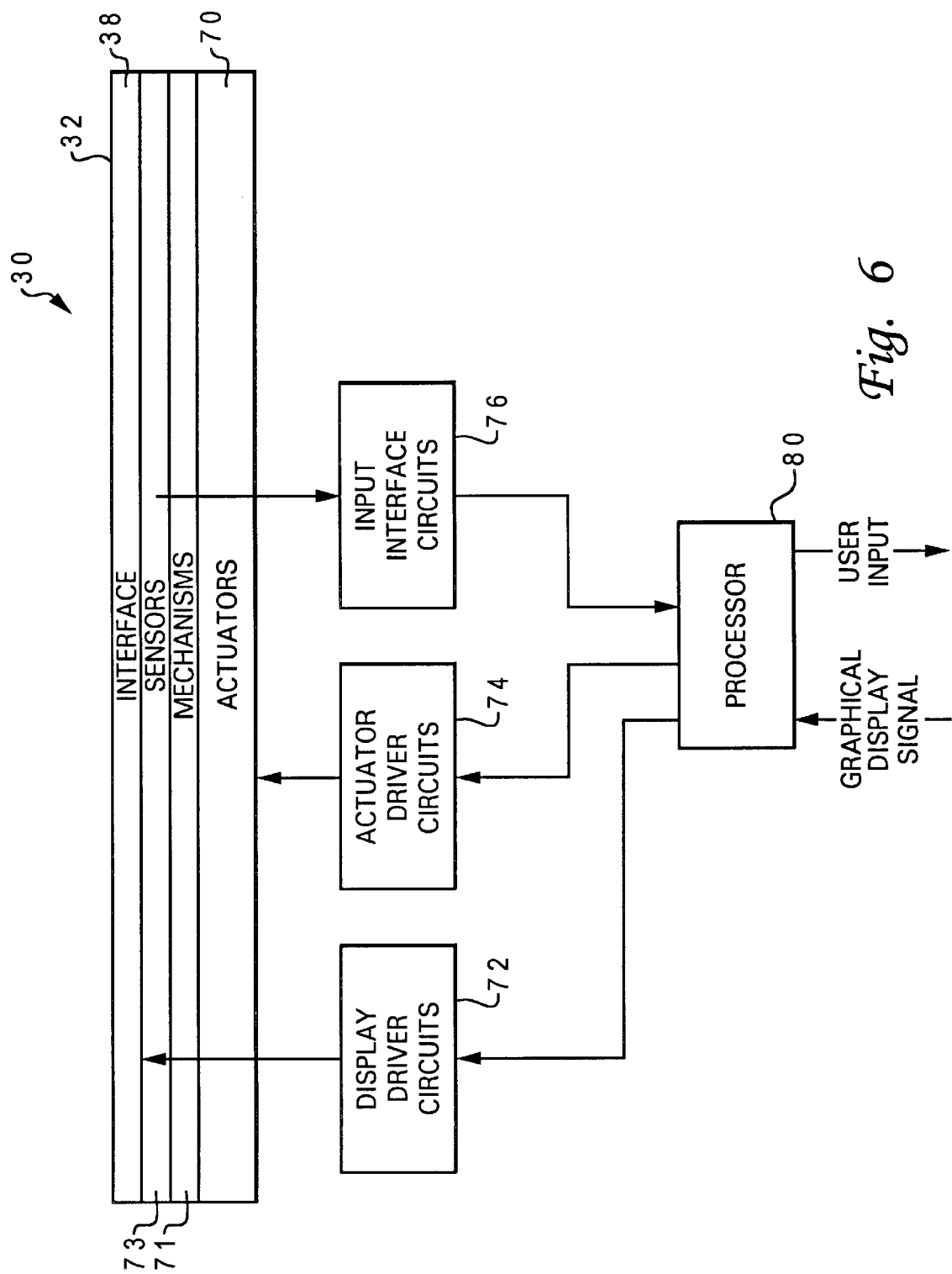
FIG. 6 illustrates a partially schematic block diagram of a controller for a topographical interface system in accordance with the method and system of the present invention.

Referring now to FIG. 6, there is illustrated a partially schematic block diagram of a controller for a topographical interface system in accordance with the method and system of the present invention. As previously depicted, topographical modeling system 30 comprises a topographical interface 32 that includes a flexible material 38 with a display surface embedded therein.

A processor 80 is preferably provided within topographical interface system 30. Processor 80 preferably interfaces with display driver circuits 72, actuator driver circuits 74, and input interface circuits 76. While not depicted, additional buses and devices, such as RAM and ROM may be included with processor 80. In addition, while not depicted, additional I/O devices may be included which are controllable by processor 80.

A graphical display signal is preferably received at processor 80. The graphical display signal preferably includes physical characteristics for three-dimensional graphical images provided by the graphical display signal. Processor 80 receives the graphical display signal from a data processing system and preferably determines and sends signals to display driver circuits 72, which will produce the desired visual graphical representation on display surface 38. The type of circuitry utilized for display driver circuits 72 will be determined by the type of display technology utilized for a particular application, while the complexity of the circuitry will be determined by the size and type of display surface 38. In addition, in response to receiving a graphical display signal, processor 80 determines and sends signals to actuator driver circuits 74, which will drive actuators 70 to move supportive mechanisms 71 to create the desired three-dimensional tactile-detectable imagery with a particular texture, resiliency, and temperature.

One type of user input preferably comes from tactile input in the form of touch, pressure and motion on topographical interface 32. Sensors 73 receive user input in the form of touch, pressure, and motion and provide signals to input interface circuits 76. Input interface circuits 76 provides signals to processor 80 that relay user input in the form of the location of user input, the magnitude of force applied, the direction of force applied, and other sensed data such as temperature and vibration. From the external force, processor 80 may determine a three-dimensional graphical image with associated physical characteristics from the sensed force. The three-dimensional graphical image with associated physical characteristics can be stored as an image file. In addition, the three-dimensional graphical image with associated physical characteristics can be retrieved and displayed on the topographical modeling system. It is important to note that while sensors 73 are depicted for sensing external force, a sensing system that senses color and shading may also be utilized with the present invention.

Additionally, from the external force, processor 80 may determine the amount of force feedback to apply to the signals sent to actuator driver circuits 74 such that the tactile-detectable graphical representation responds to user input. For example, if a graphical image of a marshmallow is displayed, the resistance of the marshmallow display surface adjusts in response to a user pressing the surface, as if pressing the surface of an actual marshmallow. Alternatively, if a graphical image of a brick is displayed, the resistance of the brick display surface adjusts in response to a user pressing the surface, as if pressing the surface of an actual brick. Thereby, the resistance of each supportive mechanism is adjusted through actuator driver circuits 74 in order to simulate surfaces with resistance.

In addition, processor 80 may determine visual feedback in response to external force. Color, shading, and shape characteristics associated with a graphical image may be utilized to determine signals for display driver circuits 72 when external force is applied. In the example of a graphical image of a marshmallow, the visual image of the marshmallow will typically expand when force is applied thereto. Therefore, as external force is applied to the surface of the marshmallow, the visual graphical representation is adjusted to show changes in shading as the shape of the marshmallow is adjusted.

Figures 7, 8:
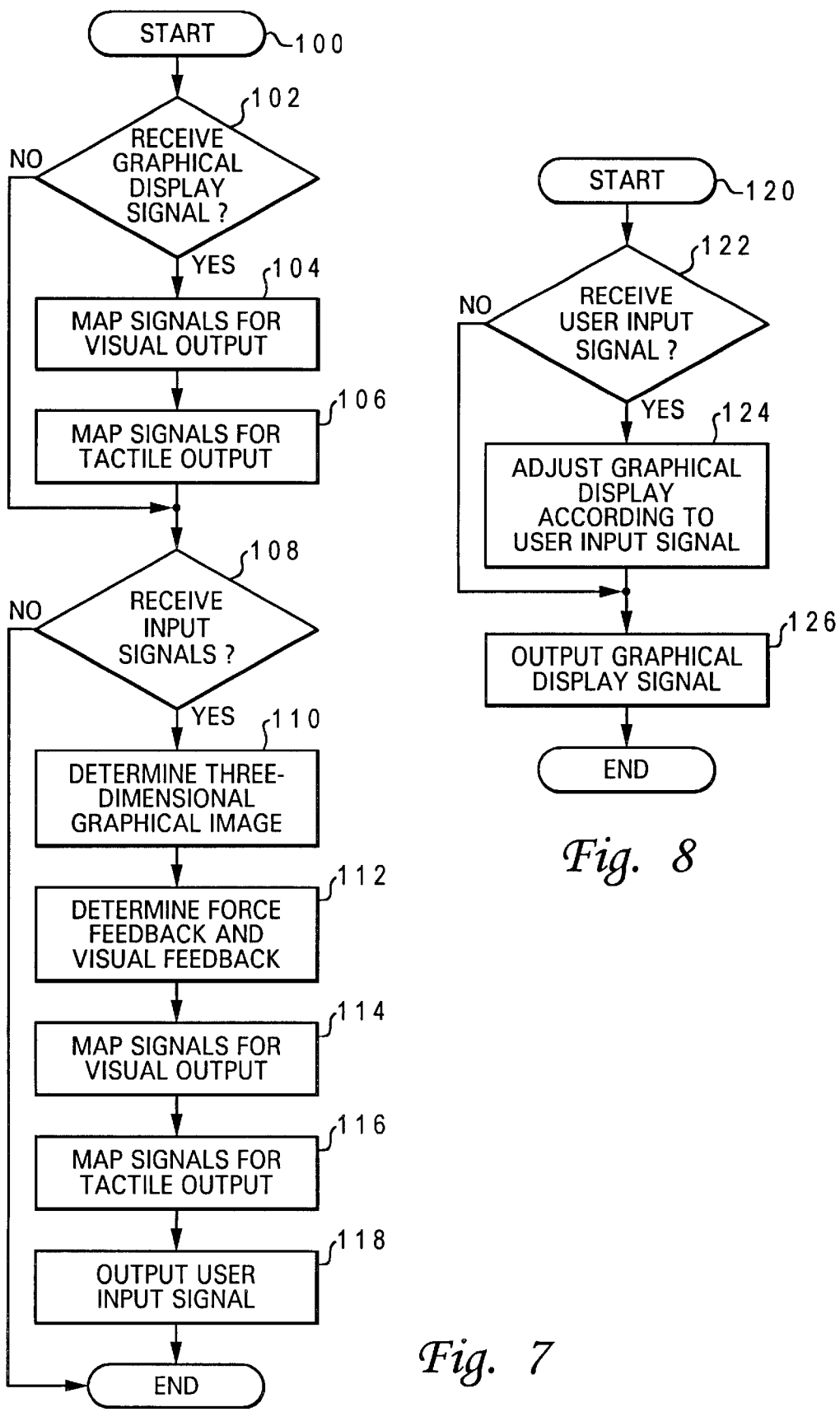
FIG. 7 depicts a high level logic flowchart of a process for controlling inputs and outputs of a topographical interface system in accordance with the method and system of the present invention.
FIG. 8 illustrates a high level logic flowchart of a process for processing inputs and determining outputs to a topographical interface system in accordance with the method and system of the present invention.

Moreover, processor 80 utilizes the input signals provided by interface control circuits 76 to determine a user input signal that is output to a data processing system indicating the type of input entered. Data processing system preferably adjusts the graphical display signal in response to the type of input entered. With reference now to FIG. 7, there is depicted a high level logic flowchart of a process for controlling inputs and outputs of a topographical interface system in accordance with the method and system of the present invention. As illustrated, the process starts at block 100 and thereafter proceeds to block 102. Block 102 depicts a determination as to whether or not a graphical display signal is received. If a graphical display signal is not received, the process passes to block 108. If a graphical display signal is received, the process passes to block 104. Block 104 illustrates mapping signals for the visual output. Next, block 106 depicts mapping signals for the tactile output. The signals for tactile output designate which supportive mechanisms to reposition and the amount to reposition those elements. In addition, the amount of resistance applied by each element may be mapped. Thereafter, the process passes to block 108.

Block 108 illustrates a determination as to whether or not input signals have been received. If input signals have not been received, the process ends. If input signals have been received, the process passes to block 110. Block 110 depicts determining a three-dimensional graphical image with physical characteristics. Next, block 112 illustrates determining force feedback and visual feedback. In determining force feedback, the control signals for the actuators are adjusted in order to model the tactile-detectable physical characteristics of the graphical image when external force is applied. In determining visual feedback, the controls signals for the visual display are adjusted to model the visual physical characteristics of the graphical image when external force is applied. Thereafter, block 114 depicts mapping signals for visual output. Block 116 illustrates mapping signals for tactile output. Thereafter, block 118 depicts outputting a user input signal and the process ends.

Referring now to FIG. 8, there is illustrated a high level logic flowchart of a process for processing inputs and determining outputs to a topographical interface system in accordance with the method and system of the present invention. As depicted, the process starts at block 120 and thereafter proceeds to block 122. Block 122 illustrates a determination as to whether user input signals are received. If user input signals are not received, the process passes to block 126. If user input signals are received, the process passes to block 124. Block 124 depicts adjusting the graphical display according to the user input signal. For example, the a two-dimensional graphical representation of the three-dimensional graphical image produced on the topographical modeling system may be adjusted to reflect visual feedback. Thereafter, block 126 depicts outputting a graphical display signal and the process ends.

Figure 9:
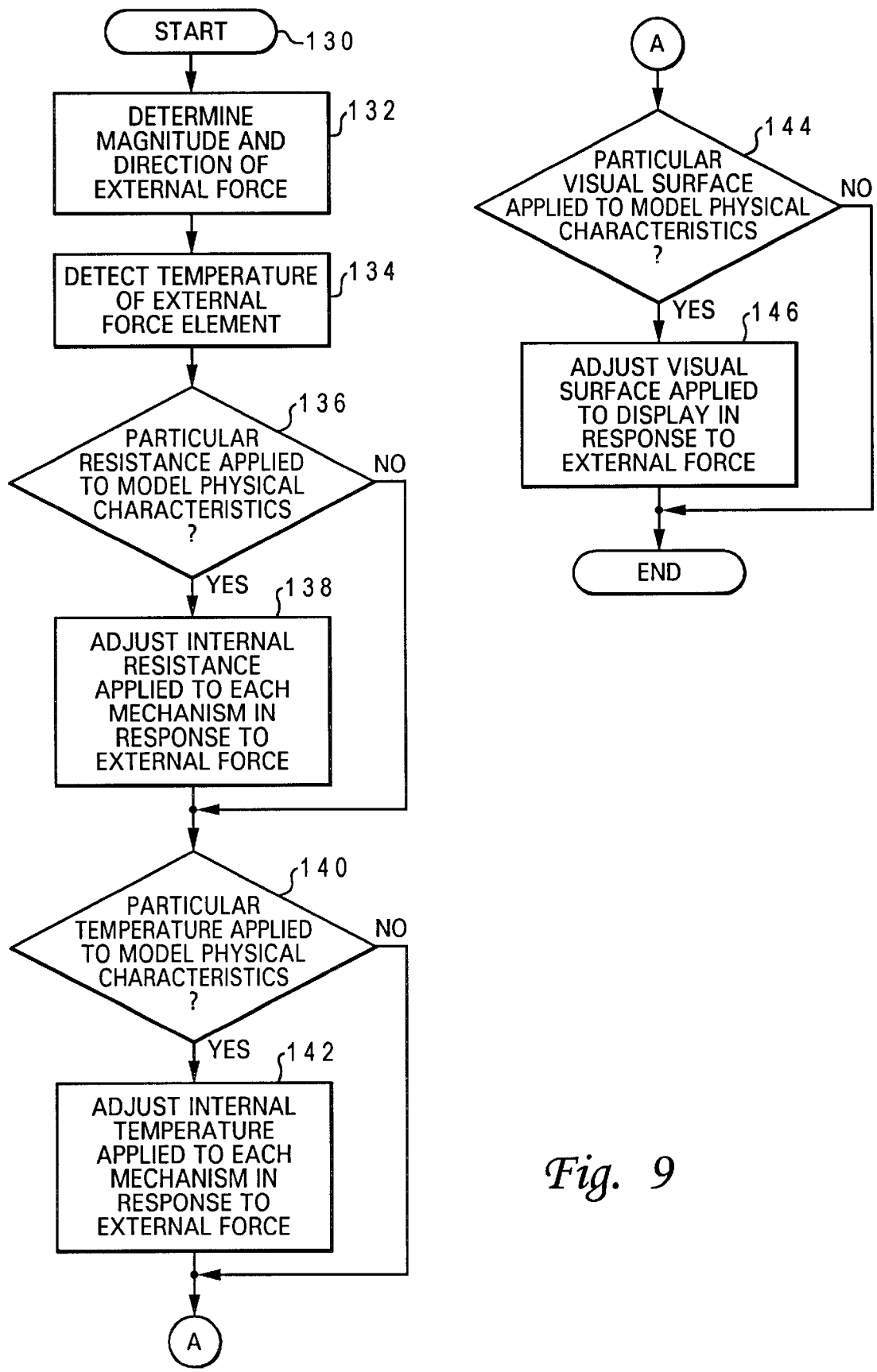
FIG. 9 depicts a high level logic flowchart of a process for determining force feedback and visual feedback in accordance with the method and system of the present invention.
Figure 10:
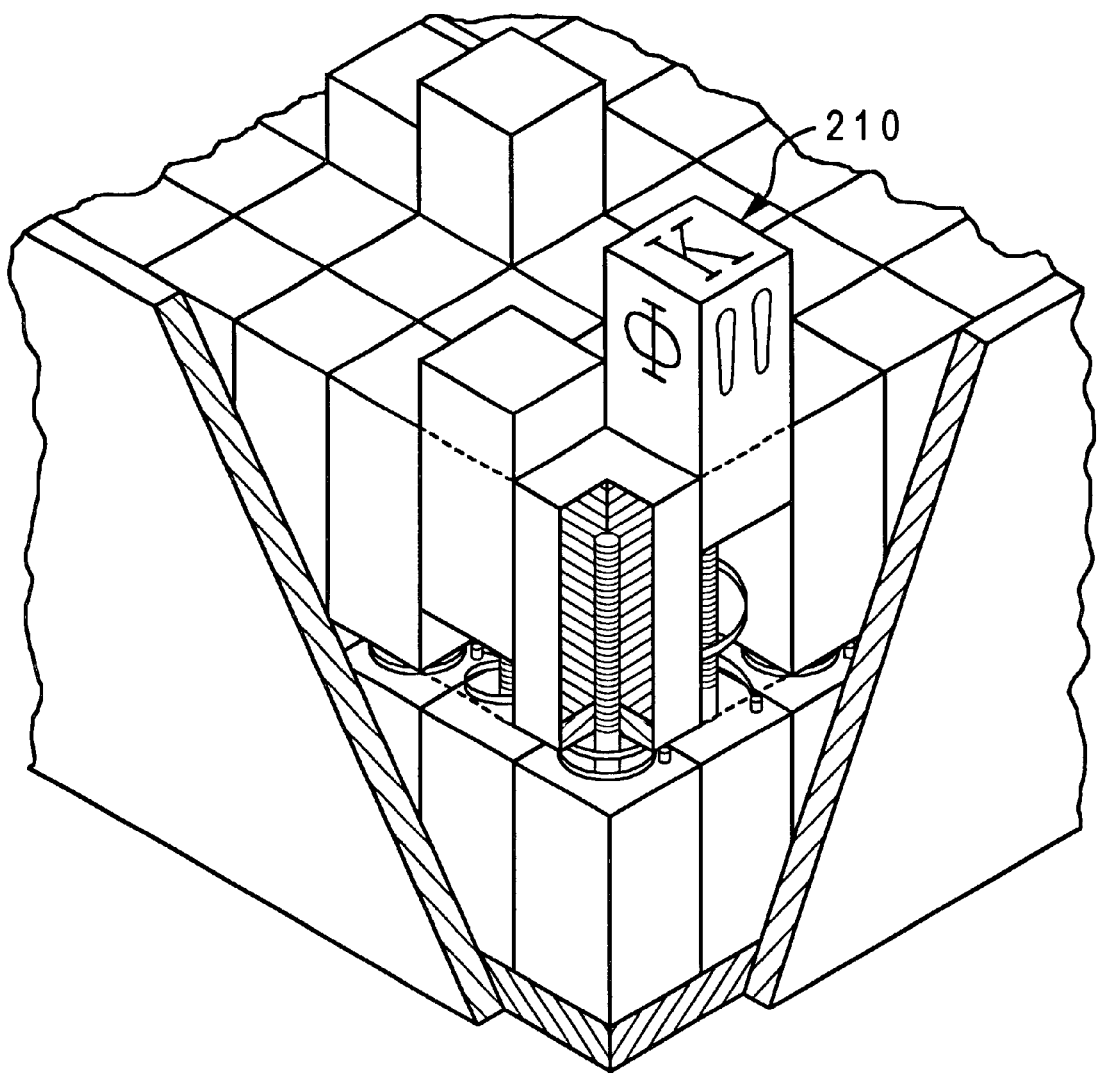
FIG. 10 depicts a prior art illustration of the three-dimensional display that provides a device for displaying objects both visually and three-dimensionally.

With reference now to FIG. 9, there is depicted a high level logic flowchart of a process for determining force feedback and visual feedback in accordance with the method and system of the present invention. As illustrated, the process starts at block 130 and thereafter proceeds to block 132. Block 132 depicts determining the magnitude and direction of externally applied force. Next, block 134 illustrates detecting the temperature of an external force element. Thereafter, block 136 depicts a determination as to whether a particular resistance is applied to model tactile physical characteristics of the graphical image. If a particular resistance is not applied, the process passes to block 140. If a particular resistance is applied, the process passes to block 138. Block 138 illustrates adjusting the internal resistance applied to each supportive mechanism that is effected in response to the magnitude and direction of the externally applied force.

Next, block 140 depicts a determination as to whether a particular temperature is applied to model tactile physical characteristics. If a particular temperature is not applied, the process passes to block 144. If a particular temperature is applied, the process passes to block 142. Block 142 illustrates adjusting the internal temperature applied to each supportive mechanism that is effected in response to the detected temperature from the externally applied force element. Next, block 144 depicts a determination as to whether a particular visual surface is applied to model visual physical characteristics. If a particular visual surface is not applied, the process ends. If a particular visual surface is applied, the process passes to block 146. Block 146 illustrates adjusting the visual surface applied to the visual display in response to the externally applied force and temperature. In this manner, objects that change surface color and shape in response to force and temperature will do so when modeled graphically. Thereafter, the process ends.

It is important to note that, although the present invention has been described in the context of a fully functional computer system, those skilled in the art will appreciate that the mechanisms of the present invention are capable of being distributed as a program product in a variety of forms, and that the present invention applies equally regardless of the particular type of signal-bearing media utilized to actually carry out the distribution. Examples of signal bearing media include, but are not limited to, recordable-type media such as floppy disks or CD ROMs and transmission-type media such as analogue or digital communications links.

While the invention has been particularly shown and described with reference to a preferred embodiment, it will be understood by those skilled in the art that various changes in form and detail may be made therein without departing from the spirit and scope of the invention.

What is claimed is:

1. A three-dimensional topographical modeling system, said system comprising:

a control surface that is adjustable to provide a tactile-detectable graphical representation of a three-dimensional graphical image and associated physical characteristics;

a sensitivity element that detects external force applied to said control surface; and a controller that adjusts said tactile-detectable graphical representation to model said associated physical characteristics of said graphical image when said external force is applied to said control surface, wherein said control surface further comprises:
  a flexible material;
  a plurality of mechanisms dispersed about said flexible material; and
  a plurality of actuators controlled by said controller for controlling the internal force applied to said flexible material by each of said plurality of mechanisms.

2. The three-dimensional topographical modeling system according to claim 1, wherein said plurality of actuators control the resistance of each of said plurality of mechanisms.

3. The three-dimensional topographical modeling system according to claim 1, wherein said plurality of actuators control the temperature of each of said plurality of mechanisms.

4. The three-dimensional topographical modeling system according to claim 1, wherein said plurality of actuators control the vibration of each of said plurality of mechanisms.

5. The three-dimensional topographical modeling system according to claim 1, wherein said plurality of actuators detect external force applied to said plurality of mechanisms.

6. The three-dimensional topographical modeling system according to claim 1, wherein said flexible material is vacuum-sealed about said plurality of mechanisms.

7. The three-dimensional topographical modeling system according to claim 1, wherein said sensitivity element further comprises a capacitive layer embedded with said control surface.

8. The three-dimensional topographical modeling system according to claim 1, wherein said system further comprises a display surface embedded within said control surface that provides a visual graphical representation of graphical output from a data processing system.

9. The three-dimensional topographical modeling system according to claim 1, wherein said controller maps control signals that determine said tactile-detectable graphical representation and a visual graphical representation from said graphical output.

10. The three-dimensional topographical modeling system according to claim 9, wherein said controller determines said control signals for said tactile detectable graphical representation from an expected reaction of said physical characteristics to said external force.

11. A three-dimensional topographical modeling system, said system comprising:

a control surface that is adjustable to provide a tactile-detectable graphical representation of a three-dimensional graphical image and associated physical characteristics;

a sensitivity element that detects external force applied to said control surface, wherein said sensitivity element detects temperature applied to said control surface; and a controller that adjusts said tactile-detectable graphical representation to model said associated physical characteristics of said graphical image when said external force is applied to said control surface.

12. A three-dimensional topographical modeling system, said system comprising:
- a control surface that is adjustable to provide a tactile-detectable graphical representation of a three-dimensional graphical image and associated physical characteristics;
- a sensitivity element that detects external force applied to said control surface;
- a controller that adjusts said tactile-detectable graphical representation to model said associated physical characteristics of said graphical image when said external force is applied to said control surface; and
- an optical layer that detects a color of an object applying external force to said control surface.

13. A three-dimensional topographical modeling system, said system comprising:
- a control surface that is adjustable to provide a tactile-detectable graphical representation of a three-dimensional graphical image and associated physical characteristics;
- a sensitivity element that detects external force applied to said control surface;
- a controller that adjusts said tactile-detectable graphical representation to model said associated physical characteristics of said graphical image when said external force is applied to said control surface, wherein said controller renders a three-dimensional image from said sensed external force, such that a three-dimensional image with defined physical characteristics is scanned.

14. The three-dimensional topographical modeling system according to claim 13, wherein said scanned three-dimensional image with defined physical characteristics is output as a graphical image with associated physical characteristics to a three-dimensional topographical modeling system.

15. A method for three-dimensional topographical modeling, said method comprising the steps of
- controlling a control surface that is adjustable to provide a graphical representation of a three-dimensional graphical image and associated physical characteristics, wherein said controlling a control surface step comprises controlling a plurality of actuators that control the internal force applied to a flexible material by each of said plurality of mechanisms dispersed about said flexible material;
- detecting external force applied to said control surface; and
- adjusting said tactile-detectable graphical representation to model said associated physical characteristics of said graphical image when said external force is applied to said control surface.

16. The method for three-dimensional topographical modeling according to claim 15, wherein said step of controlling a plurality of actuators further comprises the step of:
- controlling the resistance of each of said plurality of mechanisms.

17. The method for three-dimensional topographical modeling according to claim 15, wherein said step of controlling a plurality of actuators further comprises the step of:
- controlling the temperature of each of said plurality of mechanisms.

18. The method for three-dimensional topographical modeling according to claim 15, wherein said step of controlling a plurality of actuators further comprises the step of:
- controlling the vibration of each of said plurality of mechanisms.

19. The method for three-dimensional topographical modeling according to claim 15, wherein said step of controlling a plurality of actuators further comprises the step of:
- detecting external force applied to said plurality of mechanisms.

20. The method for three-dimensional topographical modeling according to claim 15, wherein said method further comprises:
- controlling a display surface embedded within said control surface with a visual graphical representation of said graphical image.

21. The method for three-dimensional topographical modeling according to claim 15, wherein said method further comprises the step of:
- mapping control signals that determine said tactile-detectable graphical representation and said visual graphical representation from said graphical output.

22. The method for three-dimensional topographical modeling according to claim 21, wherein said step of mapping control signals further comprises the step of:
- determining said control signals for said tactile detectable graphical representation from an expected reaction of said physical characteristics to said external force.

23. A method for three-dimensional topographical modeling, said method comprising the steps of:
- controlling a control surface that is adjustable to provide a graphical representation of a three-dimensional graphical image and associated physical characteristics;
- detecting external force applied to said control surface, wherein said step of detecting external force comprises detecting the temperature of external force applied to said plurality of mechanisms; and
- adjusting said tactile-detectable graphical representation to model said associated physical characteristics of said graphical image when said external force is applied to said control surface.

24. A method for three-dimensional topographical modeling, said method comprising the steps of:
- controlling a control surface that is adjustable to provide a graphical representation of a three-dimensional graphical image and associated physical characteristics;
- detecting external force applied to said control surface;
- detecting a color of an object applying external force to said control surface; and
- adjusting said tactile-detectable graphical representation to model said associated physical characteristics of said graphical image when said external force is applied to said control surface.

25. A method for three-dimensional topographical modeling, said method comprising the steps of:
- controlling a control surface that is adjustable to provide a graphical representation of a three-dimensional graphical image and associated physical characteristics;
- detecting external force applied to said control surface; and
- adjusting said tactile-detectable graphical representation to model said associated physical characteristics of said graphical image when said external force is applied to said control surface, wherein said adjusting said tactile-detectable graphical representation step comprises rendering a three-dimensional image from said sensed external force, such that a three-dimensional image with defined physical characteristics is scanned.

26. The method for three-dimensional topographical modeling according to claim 25, wherein said step of adjusting said tactile-detectable graphical representation and said visual graphical representation further comprises the step of:

outputting said scanned three-dimensional image with defined physical characteristics as a graphical image with associated physical characteristics to a three-dimensional topographical modeling system.

27. A program, residing on a computer usable medium having computer readable program code means, said program comprising:

means for enabling a control surface to provide a tactile-detectable graphical representation of graphical image and associated physical characteristics;

means for detecting an external force applied to said control surface;

means for controlling the resistance of said control surface; and means for adjusting said tactile-detectable graphical representation to model said associated physical characteristics of said graphical image when external force is applied to said control surface.

28. The program according to claim 27, further comprising:

means for enabling a visual graphical representation of graphical image.

29. The program according to claim 27, further comprising:

means for detecting the vibration of said external force.

30. The program according to claim 27, further comprising:

means for mapping control signals that determine said tactile-detectable graphical representation and said visual graphical representation from said graphical output.

31. The program according to claim 30, further comprising:

means for determining said control signals for said tactile detectable graphical representation from an expected reaction of said physical characteristics to said external force.

32. A program, residing on a computer usable medium having computer readable program code means, said program comprising:

means for enabling a control surface to provide a tactile-detectable graphical representation of graphical image and associated physical characteristics;

means for detecting an external force applied to said control surface;

means for controlling the temperature of said control surface; and means for adjusting said tactile-detectable graphical representation to model said associated physical characteristics of said graphical image when external force is applied to said control surface.

33. A program, residing on a computer usable medium having computer readable program code means, said program comprising:

means for enabling a control surface to provide a tactile-detectable graphical representation of graphical image and associated physical characteristics;

means for detecting a color of an object applying external force to said control surface;

means for detecting an external force applied to said control surface; and means for adjusting said tactile-detectable graphical representation to model said associated physical characteristics of said graphical image when external force is applied to said control surface.

34. A program, residing on a computer usable medium having computer readable program code means, said program comprising:

means for enabling a control surface to provide a tactile-detectable graphical representation of graphical image and associated physical characteristics;

means for detecting an external force applied to said control surface;

means for detecting the temperature of said external force; and means for adjusting said tactile-detectable graphical representation to model said associated physical characteristics of said graphical image when external force is applied to said control surface.

35. A program, residing on a computer usable medium having computer readable program code means, said program comprising:

means for enabling a control surface to provide a tactile-detectable graphical representation of graphical image and associated physical characteristics;

means for detecting an external force applied to said control surface;

means for adjusting said tactile-detectable graphical representation to model said associated physical characteristics of said graphical image when external force is applied to said control surface; and means for rendering a three-dimensional image from said sensed external force, such that a three-dimensional image with defined physical characteristics is scanned.

36. A program, residing on a computer usable medium having computer readable program code means, said program comprising:

means for enabling a control surface to provide a tactile-detectable graphical representation of graphical image and associated physical characteristics;

means for detecting an external force applied to said control surface;

means for adjusting said tactile-detectable graphical representation to model said associated physical characteristics of said graphical image when external force is applied to said control surface; and means for outputting said scanned three-dimensional image with defined physical characteristics as a graphical image with associated physical characteristics to a three-dimensional topographical modeling system.

* * * * *